(12) United States Patent
Ducharme et al.

(10) Patent No.: US 12,528,260 B2
(45) Date of Patent: Jan. 20, 2026

(54) METHOD OF FORMING A SPORTING IMPLEMENT

(71) Applicant: Bauer Hockey Ltd., Blainville (CA)

(72) Inventors: Mathieu Ducharme, Prevost (CA); Jean-Frédérik Caron Kardos, Laval (CA); Martin Chambert, Piedmont (CA)

(73) Assignee: Bauer Hockey, LLC, Exeter, NH (US)

( * ) Notice: Subject to any disclaimer, the term of this patent is extended or adjusted under 35 U.S.C. 154(b) by 0 days.

(21) Appl. No.: 18/521,188

(22) Filed: Nov. 28, 2023

(65) Prior Publication Data

US 2024/0092042 A1    Mar. 21, 2024

Related U.S. Application Data

(62) Division of application No. 16/566,081, filed on Sep. 10, 2019, now Pat. No. 11,865,797.

(Continued)

(51) Int. Cl.
    *B29C 70/48*      (2006.01)
    *B29C 70/52*      (2006.01)
    (Continued)

(52) U.S. Cl.
    CPC ........... *B29C 70/48* (2013.01); *B29C 70/521* (2013.01); *B29C 70/523* (2013.01);
    (Continued)

(58) Field of Classification Search
    CPC ..... B29C 70/52; B29C 70/521; B29C 70/523; B29C 70/545; B29K 2101/12; B29K 2309/08
    See application file for complete search history.

(56) References Cited

U.S. PATENT DOCUMENTS 4,070,021 A    1/1978   Cecka et al.
4,123,488 A    10/1978   Lawson
(Continued)

FOREIGN PATENT DOCUMENTS

WO      96/39231 A1    12/1996

OTHER PUBLICATIONS

Singh et al, Processing of Polymers and Their Composites: A Review, 2018, Encyclopedia of Materials: Composites, vol. 1, Elsevier Inc, 27 pages, pertinent pp. 581-583, https://doi.org/10.1016/B978-0-12-803581-8.11435-3 (Year: 2018).*

(Continued)

*Primary Examiner* — Emmanuel S Luk
(74) *Attorney, Agent, or Firm* — Banner & Witcoff, Ltd.

(57) ABSTRACT

A method of forming a sporting implement includes placing a plurality of fibers in a cavity formed in a first portion of a mold, the mold having an inlet and an outlet. A second portion of the mold is positioned in contact with the first portion such that the cavity cooperates with the second portion of the mold to define a chamber. A first material is mixed with a second material to form a thermoplastic resin. The thermoplastic resin is injected into the chamber through the inlet. The inlet and outlet are closed, and the thermoplastic resin completely polymerizes so as to form a fiber reinforced sporting element in the chamber, and the sporting element is removed from the chamber.

18 Claims, 6 Drawing Sheets

Related U.S. Application Data

(60) Provisional application No. 62/730,232, filed on Sep. 12, 2018.

(51) Int. Cl.
  *B29C 70/54* (2006.01)
  *B29K 101/12* (2006.01)
  *B29K 309/08* (2006.01)
  *B29L 31/52* (2006.01)

(52) U.S. Cl.
  CPC ........ *B29C 70/545* (2013.01); *B29K 2101/12* (2013.01); *B29K 2309/08* (2013.01); *B29L 2031/5227* (2013.01)

(56) References Cited

U.S. PATENT DOCUMENTS

| | | | |
|---|---|---|---|
| 4,124,670 A | 11/1978 | Cecka et al. | |
| 4,154,634 A * | 5/1979 | Shobert | B29C 70/528 264/258 |
| 4,238,437 A | 12/1980 | Rolston | |
| 4,409,288 A | 10/1983 | Spain | |
| 4,474,906 A | 10/1984 | Nakama et al. | |
| 4,604,319 A | 8/1986 | Evans et al. | |
| 4,883,552 A * | 11/1989 | O'Connor | B29C 70/525 264/281 |
| 4,892,764 A * | 1/1990 | Drain | C08J 3/243 264/494 |
| 5,035,764 A | 7/1991 | Blake | |
| 5,091,436 A * | 2/1992 | Frisch | C04B 26/16 521/137 |
| 5,217,221 A | 6/1993 | Baum | |
| 5,333,857 A | 8/1994 | Lallemand | |
| 5,556,496 A * | 9/1996 | Sumerak | B29C 70/525 156/166 |
| 5,746,955 A * | 5/1998 | Calapp | B29C 53/66 264/258 |
| 5,783,013 A * | 7/1998 | Beckman | B29C 70/523 156/433 |
| 5,888,601 A * | 3/1999 | Quigley | B29C 70/207 428/36.1 |
| 6,395,210 B1 * | 5/2002 | Head | B29C 70/525 264/171.26 |
| 6,918,847 B2 | 7/2005 | Gans et al. | |
| 7,261,787 B2 | 8/2007 | Bellefleur et al. | |
| 7,326,136 B2 | 2/2008 | Jean et al. | |
| 7,850,553 B2 | 12/2010 | Goldsmith et al. | |
| 8,329,280 B2 | 12/2012 | Taketa et al. | |
| 8,597,016 B2 * | 12/2013 | Brown | C08G 18/4804 425/111 |
| 9,777,140 B2 | 10/2017 | Gerard et al. | |
| 9,981,415 B2 * | 5/2018 | Kenny | B29C 48/154 |
| 10,066,134 B2 | 9/2018 | Renkel et al. | |
| 12,006,435 B2 * | 6/2024 | Dyksterhouse | C08L 23/06 |
| 2002/0123288 A1 * | 9/2002 | Davies | D04H 3/14 442/364 |
| 2003/0104738 A1 | 6/2003 | Porter | |
| 2004/0054372 A1 | 3/2004 | Corden et al. | |
| 2004/0067711 A1 * | 4/2004 | Bliton | B29C 70/30 442/394 |
| 2004/0161611 A1 | 8/2004 | Mueller et al. | |
| 2005/0127579 A1 | 6/2005 | Suzuki | |
| 2006/0049541 A1 * | 3/2006 | Sutton | C08J 3/201 264/320 |
| 2007/0173157 A1 | 7/2007 | Trifu et al. | |
| 2007/0224377 A1 | 9/2007 | Leimbacher et al. | |
| 2008/0145634 A1 * | 6/2008 | Hillermeier | B29C 70/525 428/221 |
| 2010/0062238 A1 | 3/2010 | Doyle et al. | |
| 2011/0111172 A1 | 5/2011 | Gideon et al. | |
| 2011/0293914 A1 * | 12/2011 | Maurer | C08J 9/36 521/146 |
| 2011/0304066 A1 | 12/2011 | Obara | |
| 2012/0028062 A1 * | 2/2012 | Elia | B32B 5/024 428/474.7 |
| 2012/0046136 A1 | 2/2012 | Allen et al. | |
| 2012/0108131 A1 * | 5/2012 | Elia | B32B 27/12 428/435 |
| 2012/0299216 A1 | 11/2012 | Carnahan et al. | |
| 2013/0113133 A1 * | 5/2013 | Kashikar | B29C 70/543 428/221 |
| 2013/0136890 A1 * | 5/2013 | Maliszewski | B29C 48/06 428/113 |
| 2014/0004308 A1 * | 1/2014 | Taniguchi | B29C 43/18 428/156 |
| 2015/0099848 A1 | 4/2015 | Fish | |
| 2015/0126646 A1 | 5/2015 | Hochstetter et al. | |
| 2015/0273772 A1 | 10/2015 | Cauchois et al. | |
| 2016/0167259 A1 * | 6/2016 | Plagemann | C09D 4/00 264/129 |
| 2017/0361547 A1 | 12/2017 | Cauchois et al. | |
| 2018/0043637 A1 | 2/2018 | Jones | |
| 2018/0154614 A1 | 6/2018 | Hosoda et al. | |
| 2019/0061286 A1 | 2/2019 | Giehl et al. | |
| 2019/0126521 A1 | 5/2019 | Yasuda et al. | |
| 2019/0127539 A1 * | 5/2019 | Dyksterhouse | C08J 5/243 |
| 2019/0284329 A1 | 9/2019 | Niegemeier et al. | |
| 2020/0157293 A1 * | 5/2020 | Chmielewski | C08J 5/043 |
| 2022/0080271 A1 * | 3/2022 | Wright | A63B 24/0003 |
| 2023/0166162 A1 * | 6/2023 | Wright | A63B 60/16 473/282 |
| 2024/0084777 A1 * | 3/2024 | Redmond-Gray | B29C 70/02 |

OTHER PUBLICATIONS

Feb. 11, 2020 (EP) Partial European Search Report Application No. 19197066.4.
Jun. 12, 2020 (EP) European Search Report Application No. 19197066.4.
Nov. 12, 2020—(CA) Office Action—App No. 3,055,154.
Design News, In Brief: Plastics, metals, and other materials, Jul. 6, 1998, https://www.designnews.com/materials-assembly/brief-plastics-metals-and-other-materials, pp. 3-4 (Year: 1998).
YouTube video "The Pultrusion Process" Posted Jan. 19, 2010, <https://www.youtube.com/watch?v=4MoHNZB5b_Y>, visited Jul. 10, 2019.

* cited by examiner

METHOD OF FORMING A SPORTING IMPLEMENT

CROSS-REFERENCE TO RELATED APPLICATIONS

This application is a divisional application which claims priority to U.S. patent application Ser. No. 16/566,081, filed on Sep. 10, 2019, which claims priority to U.S. Provisional Application No. 62/730,232, filed Sep. 12, 2018, each of which are hereby incorporated by reference in their entireties.

FIELD

This disclosure relates generally to a method of forming a sporting implement. More particularly, aspects of this disclosure relate to forming a sporting implement using thermoplastic materials and fibers.

BACKGROUND

Many sporting implements are formed with glass or carbon fiber reinforced composite structures. These composite structures can be formed with thermoset resins (epoxies), which are not very resistant to impact, and may delaminate at the interface between fiber layers.

Fiber reinforced thermoplastic sporting elements have been made from thermoplastic pre-impregnated carbon/glass tapes that are laminated at various angles and then pressed at a high temperature above the melting point of that specific thermoplastic. Other fiber reinforced thermoplastic sporting elements use co-mingled fibers (carbon fiber interlaced with thermoplastic yarn) to create braids or woven fabric, which is placed in a mold and then heated again above the melting point of that specific thermoplastic. These materials typically require high processing temperatures and pressure.

It may be desirable to provide a method of forming fiber reinforced thermoplastic items that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

In accordance with a first aspect, a method of forming a sporting implement may include placing a plurality of fibers in a cavity formed in a first portion of a mold, where the mold has an inlet and an outlet. A second portion of the mold can be positioned in contact with the first portion such that the cavity cooperates with the second portion of the mold to define a chamber. A first material can be mixed with a second material to form a thermoplastic resin. The thermoplastic resin can be injected into the chamber through the inlet. The inlet and outlet are closed, and the thermoplastic resin completely polymerizes so as to form a fiber reinforced sporting element in the chamber the sporting element is removed from the chamber.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
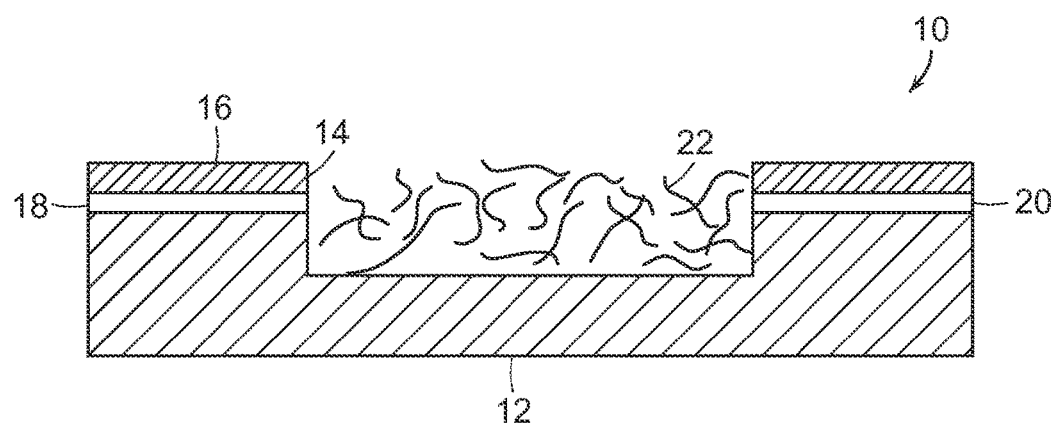
FIG. 1 is a section view of a first portion of a mold assembly with fibers in a cavity of the first portion.

The figures referred to above are not drawn necessarily to scale, should be understood to provide a representation of particular embodiments, and are merely conceptual in nature and illustrative of the principles involved. Some features of the mold assembly and components depicted in the drawings have been enlarged or distorted relative to others to facilitate explanation and understanding. The same reference numbers are used in the drawings for similar or identical components and features shown in various alternative embodiments. Mold assemblies as disclosed herein would have configurations and components determined, in part, by the intended application and environment in which they are used.

DETAILED DESCRIPTION OF EMBODIMENTS

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while the terms "top" and "bottom" and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

In general, as discussed herein, aspects of this disclosure relate to methods for fabricating sporting implements with in-situ polymerizable thermoplastic materials and fibers. The thermoplastic materials and fibers can be incorporated into any sporting implements, such as baseball bats, lacrosse sticks, hockey sticks, rackets, helmets, and other protective equipment.

Referring to FIG. 1, a mold assembly 10 includes a first portion 12 having a cavity 14 formed in an upper or top surface 16 thereof. Cavity 14 may be a formed as a depression, groove, or indentation in top surface 16. First portion 12 includes an inlet 18 extending from cavity 14 to an exterior of first portion 12 and an outlet 20 extending from cavity 14 to an exterior of first portion 12.

To form a sporting element in mold assembly 10, a plurality of fibers 22 are placed in cavity 14. In certain embodiments, fibers 22 are dry fibers. Fibers 22 may be braided fibers, woven fibers or fabric, or stitched tapes, for example. Exemplary fibers include carbon, glass, and aramid, for example. In certain embodiments, fibers 22 are elongate elements with a length significantly greater than their thickness or diameter. Fibers 22 may have a diameter of approximately 6.8 µm. The length of fibers 22 may vary depending on their location in cavity 14 and their ultimate location in the sporting element to be formed in mold assembly 10. For example, in an embodiment where the sporting element to be formed is a blade for a hockey stick, some fibers 22 may extend from one end of the blade to the other, and have a length of approximately 300 mm. In other embodiments, fibers 22 may be only a few mm long if, for example, they are positioned in the mold such that they are in the throat at an angle.

The term "approximately" as used herein is meant to mean close to, or about, a particular value, within the constraints of sensible commercial engineering objectives, costs, manufacturing tolerances, and capabilities in the field of manufacturing implements formed of thermoplastic materials and fibers. Similarly, the term "substantially" as used herein is meant to mean mostly the same as, or almost the same as, within the constraints of sensible commercial engineering objectives, costs, manufacturing tolerances, and capabilities in the field of manufacturing implements formed of thermoplastic materials and fibers.

In certain embodiments, fibers 22 may be randomly dispersed within cavity 14. In other embodiments, fibers 22 can be oriented in an orderly pattern within cavity 14. For example, fibers 22 can be woven. In certain embodiments, fibers 22 can be woven in a 3D structure having fibers oriented in three directions, namely the X direction (warp), the Y direction (weft), and the Z direction. An exemplary 3D woven fiber structure is described in U.S. application Ser. No. 15/448,769, the entire disclosure of which is incorporated herein by reference in its entirety.

In certain embodiments, fibers 22 may be coated in order to facilitate positioning of dry fibers 22 in cavity 14. Exemplary coatings for fibers 22 include epoxy, polyurethane, and aerosol adhesives. Other suitable coatings for fibers 22 will become readily apparent to those of skill in the art, given the benefit of this disclosure.

Figure 2:
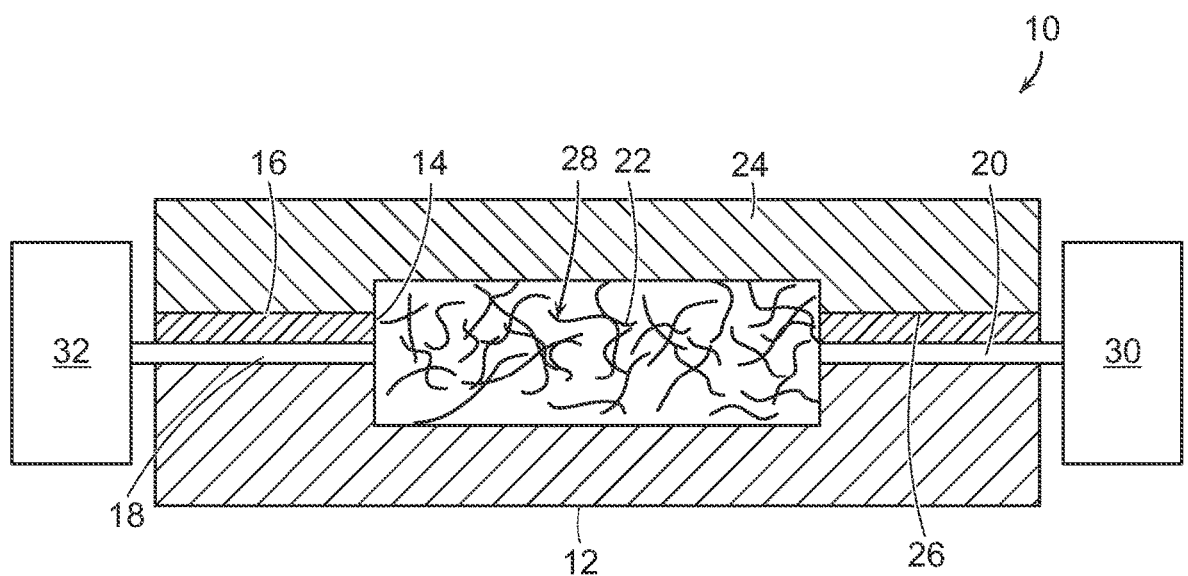
FIG. 2 is a section view of the mold assembly of FIG. 1 with a second portion secured to the first portion, showing injection of gas into a chamber of the mold assembly and a vacuum created in the chamber.

After fibers 22 are placed in cavity 14, a second portion 24 of mold assembly 10 is placed in contact with first portion 12, as illustrated in FIG. 2, such that a lower or bottom surface 26 of second portion 24 is in abutting contact with top surface 16 of first portion 12. Cavity 14 and second portion 24 cooperate to define a chamber 28. Chamber 28 is shaped so as to correspond to the outline of a sporting implement to be formed in mold assembly 10. Thus, for example, chamber 28 may be in the shape of a hockey stick, baseball bat, or a shaft for a golf club or lacrosse stick. It is to be appreciated that bottom surface 26 will be contoured to provide a surface of the sporting element to be formed within chamber 28. Thus, the bottom surface 26 will define the upper portion of chamber 28 and will be contoured as needed such that the surface of cavity 14 and the contoured portion of bottom surface 26 will serve to define the outer surface of the sporting element to be formed in chamber 28, as seen and described in greater detail below in FIG. 5.

With second portion 24 in contact with first portion 12, chamber 28 is in fluid communication with an exterior of mold assembly 10 by way of inlet 18 and by way of outlet 20.

In certain embodiments, it may be advantageous to reduce the humidity level in chamber 28. In order to do so, a vacuum pump 30 may be operably connected to chamber 28 by way of outlet 20 so as to create a vacuum within chamber 28. In other embodiments, a vacuum bag (not shown) could be placed over first portion 12 in the place of second portion 24.

Additionally, chamber 28 may be purged with a gas to help prevent moisture or any other contamination from affecting the formation of the sporting element within mold assembly 10. As seen in FIG. 2, a gas reservoir 32 may be operably connected to chamber 28 by way of inlet 18, and the contents of gas reservoir 32 may be used to flush or purge chamber 28. In certain embodiments, gas reservoir 32 may contain nitrogen. Other suitable gasses for the purging of chamber 28 will become readily apparent to those skilled in the art, given the benefit of this disclosure.

Figure 3:
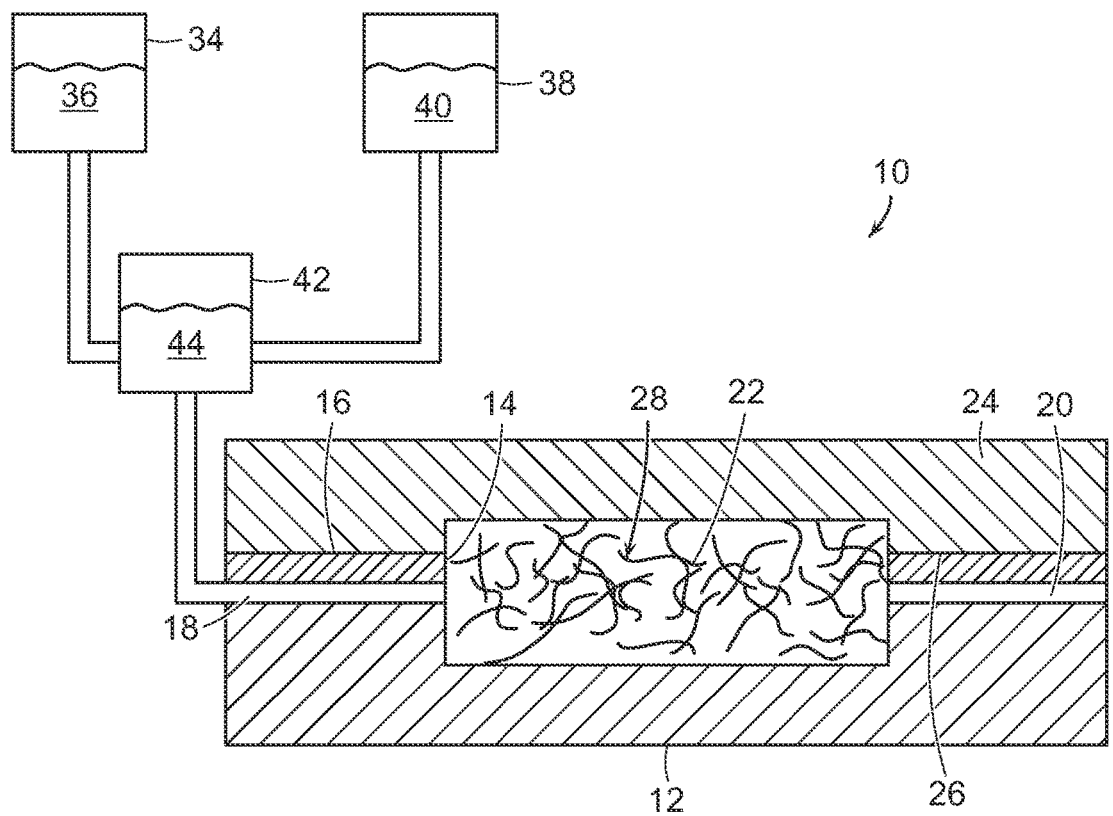
FIG. 3 is a section view of the mold assembly of FIG. 2, shown with a mixing assembly for thermoplastic resin to be injected into the chamber.

The in-situ polymerization of a thermoplastic resin with fibers 22 in chamber 28 will now be discussed. As seen in FIG. 3, a first resin chamber 34 contains a first resin material 36 while a second resin chamber 38 contains a second resin material 40. In certain embodiments, first resin chamber 34 and second resin chamber 38 may be heated, which will lower the viscosity of these materials and facilitate their later injection into chamber 28. In certain embodiments, first resin chamber 34 and second resin chamber 38 may be heated to between approximately 25° C. and approximately 50° C.

First resin material 36 and second resin material 40 are combined in a mixing chamber 42 to form a polymerizable thermoplastic resin 44. It is to be appreciated that thermoplastic resin 44 may be a thermoplastic matrix including nylon, polyurethane, or acrylic. In certain embodiments, first resin material 36 may be an acrylic monomer and second resin material 40 may be peroxide, which initiates polymerization of the acrylic monomer.

It is to be appreciated that mixing chamber 42 may be a static mixer or a dynamic mixer.

Figure 4:
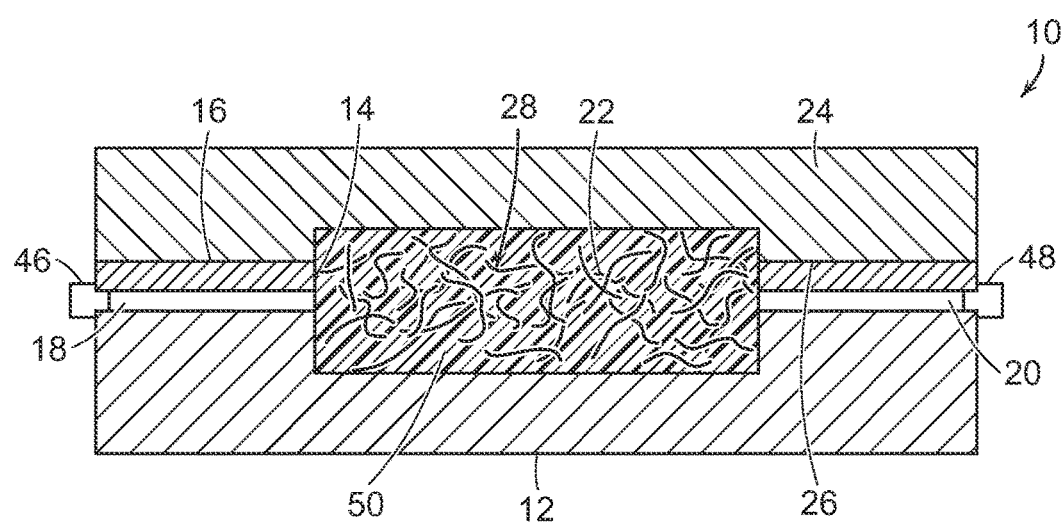
FIG. 4 is a section view of the mold assembly of FIG. 2, shown with thermoplastic resin and fibers in the chamber of the mold assembly.

Thermoplastic resin 44 is then injected through inlet 18 into chamber 28 until chamber 28 is full. As illustrated in FIG. 4, an inlet plug 46 is then placed in inlet 18 and an outlet plug 48 is placed in outlet 20, thereby sealing chamber 28.

Thermoplastic resin 44 is able to be injected into chamber 28 at low temperatures (i.e., room temperature) due to its low viscosity. In certain embodiments, thermoplastic resin 44 can be injected into chamber 28 at a temperature of between approximately 20° C. and approximately 60° C. Injection at such low temperatures reduces tooling needs and costs, thereby resulting in a less complex and less expensive manufacturing process.

Due to the low viscosity of the mixed thermoplastic resin 44, impregnation of fibers 22 with the resin is easier to accomplish. Thus, even with a fiber content above 50%, fibers 22 can be impregnated with thermoplastic resin 44.

The mixing of thermoplastic resin 44, rather than using pre-formed resin pellets helps reduce manufacturing costs and processing time.

With such a process, sporting elements with complex geometries can be formed in mold assembly 10. Further, such sporting elements have improved impact resistance, fatigue resistance, and delamination resistance.

The mixture of fibers 22 and thermoplastic resin 44 within chamber 28 will then polymerize and become a solid, thereby forming a fiber reinforced thermoplastic sporting element 50 having a shape matching that of chamber 28. Upon complete curing of sporting element 50, its melt temperature will be much higher, typically greater than approximately 200° C.

Figure 5:
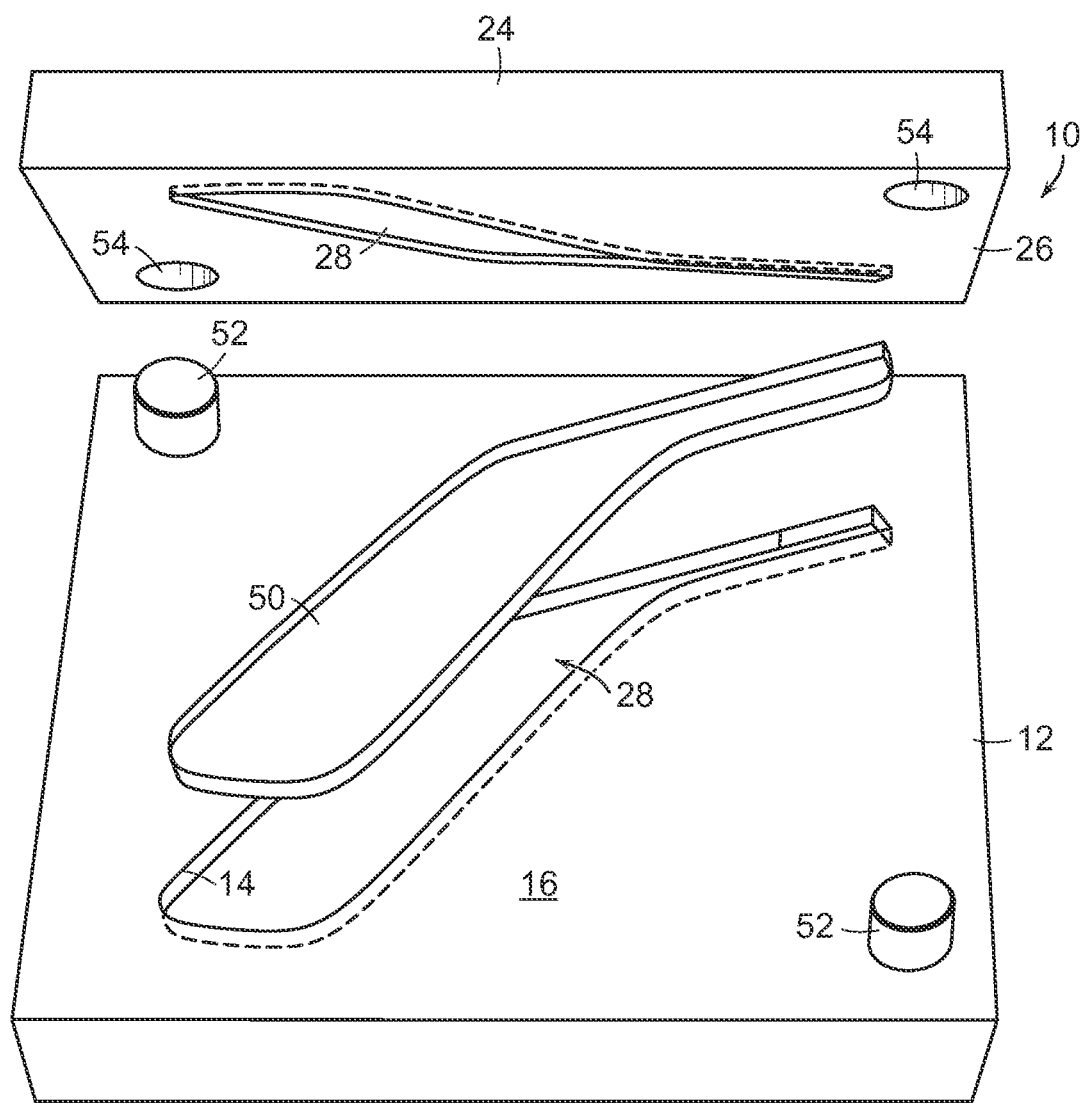
FIG. 5 is an exploded view of the mold assembly of FIG. 3, shown with a sporting element being removed from the chamber.

As seen in FIG. 5, sporting element 50 (seen here as a blade of a hockey stick), can then be removed from chamber 28 of mold assembly 10, and typical post-embellishment processing steps such as trimming, buffing, washing, gluing, and painting may be performed.

As seen in FIG. 5, first mold portion 12 and second mold portion 24 may include registration elements to help align second mold portion 24 as is it is placed in contact with first mold portion 12. In the illustrated embodiment, first mold portion 12 includes projections 52 that extend outwardly from upper surface 16 and are received in mating apertures 54 formed in bottom surface 26 of second mold portion 24. Although FIG. 5 shows two projections 52 and two mating apertures 54, it is to be appreciated that first mold portion 12 and second mold portion 24 can have any number of mating registration elements. In other embodiments, the projections could be formed on bottom surface 26 of second mold portion 24 and the apertures could be formed in upper surface 16 of first mold portion 12. Additionally, it is to be appreciated that the registration elements need not be mating projections and apertures, and can take on other shapes or forms. Other suitable registration elements will become readily apparent to those skilled in the art, given the benefit of this disclosure.

Advantageously, the sporting implements can be recycled since the thermoplastic resin can be reformed. Thus, if a hockey stick or baseball bat formed with this process is broken or compromised during use, it does not need to be thrown away. Rather, it can be recycled, or even repaired by applying heat and pressure to the sporting implement and thereby repairing/recycling the structure.

Figure 6:
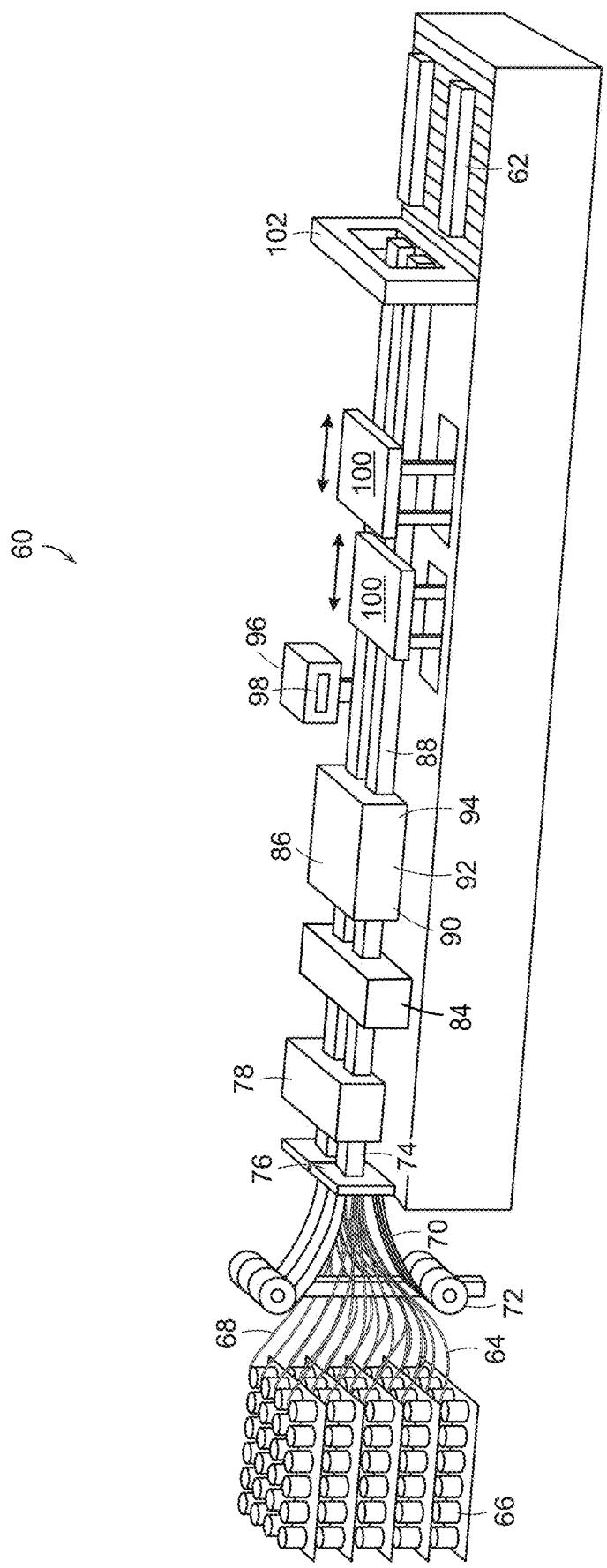
FIG. 6 is a perspective view of a pultrusion device used to form an alternative embodiment of a sporting element.

In another embodiment, as illustrated in FIG. 6, a pultrusion device 60 may be used to form a sporting element 62. In the pultrusion process, continuous fibers may be combined with resin and pulled through pultrusion device 60, and heated and cured to produce a continuous linear member, which may be cut into desired lengths. In certain embodiments, sporting element 62 may be a shaft for a hockey stick, for example.

As seen in FIG. 6, a plurality of carbon or fiberglass fibers 64 may be fed into pultrusion device 60. Fiberglass fibers 64 may be fed from spools 66 and formed into long narrow bundles 68, or rovings. A mat 70 may be fed from a spool 72 and joined with fibers 64 to form a precursor 74. In certain embodiments mat 70 may be formed of glass fibers. In other embodiments, mat 70 may be formed of a braided fabric, a bi-axial fabric, or a tri-axial fabric. For example, mat 70 may be a bi-axial fabric having fibers oriented at +45° and −45° with respect to a longitudinal axis of the mat.

In other embodiments, mat 70 may be at tri-axial fabric having fibers oriented at 0°, +45°, and −45° with respect to a longitudinal axis of the mat.

Precursor 74 of fibers 64 and mat 70 may be fed through a guide 76 into a resin impregnator 78. Guide 76 may serve to form precursor 74 into a desired cross-sectional profile. In the illustrated embodiment, precursor 74 is formed in guide 76 to have a rectangular cross-section, which is suitable for forming a shaft for a hockey stick. In other embodiments, precursor 74 could be formed with a circular or elliptical cross-section. It is to be appreciated that guide 76 can be configured to provide any desired cross-sectional profile for precursor 74 depending on the desired characteristics of the shaft, which may include the flex profile and weight of the shaft.

Resin may then be injected into the fibers 64 and mat 70 of precursor 74 in resin impregnator 78. The resin injected into and impregnated in fibers 64 and mat 70 in precursor 74 may be a liquid thermoplastic such as nylon, polyurethane, or acrylic, for example. Other suitable resins will become readily apparent to those skilled in the art, given the benefit of this disclosure. In certain embodiments, resin may be at a temperature of approximately 70° C. as it is injected into fibers 64 and mat 70 of precursor 74 in resin impregnator 78.

Precursor 74 may then be fed into a die 86, where heat may be applied to precursor 74, thereby curing precursor 74 and forming a continuous linear member 88, which can ultimately be cut into individual sporting elements 62. The temperature of die 86 may vary along its length, and may be dependent on the speed at which precursor 74 is pulled through pultrusion device 60. In certain embodiments, in a front, or first portion 90 of die 86, a temperature of die 86 may be approximately 85° C., with precursor 74 traveling through pultrusion device 60 at a speed of approximately 8-12 cm/min. In a central, or second portion 92 of die 86 downstream of first portion 90, a temperature of die 86 may be approximately 95° C. In a rear, or third portion 94 of die 86 downstream of second portion 92, a temperature of die 86 may be approximately 105° C. It is to be appreciated that the temperature of die 86 may be dependent on the speed at which precursor 74 is travelling through die 86, with slower speeds requiring lower temperatures and faster speeds requiring higher temperatures in order to properly cure precursor 74. In certain embodiments, precursor 74 may travel through pultrusion device 60 at a speed of approximately 1 m/min., which would result in different temperatures of die 86 at first portion 90, second portion 92, and third portion 94.

In the illustrated embodiment, resin impregnator 78 is upstream of die 86, with preformer 84 positioned between resin impregnator 78 and die 86. It is to be appreciated that in certain embodiments, resin impregnator 78 could be immediately adjacent and upstream of die 86.

A controller 96 may be used to control pultrusion device 60, controlling parameters such as the speed at which precursor 74 travels through pultrusion device 60, and the temperature at resin impregnator 78 and die 86. Controller 96 may include a touch screen 98 in certain embodiments, providing an operator an easy to use interface to control pultrusion device 60.

One or more pulling devices 100 may be positioned downstream of die 86, which may serve to pull precursor 74 and linear member 88 through pultrusion device 60. In certain embodiments, a pair of reciprocating pulling devices 100 may operate in alternating fashion to grasp linear member 88 and pull precursor 74 through pultrusion device 60.

A cutting device 102 may be positioned downstream of pulling devices 100, and may serve to cut linear member 88 into individual sporting elements 62 having a predetermined length. As noted above, the illustrated embodiment shows a parallel pair of precursors 74 and corresponding linear members 88 being cut into corresponding pairs of sporting elements 62. In certain embodiments, cutting device 102 may be a saw. It is to be appreciated that in other embodiments cutting device 102 can be a heated blade. Other suitable cutting devices will become readily apparent to those skilled in the art, given the benefit of this disclosure.

In the illustrated embodiment, a second sporting element 62 is formed simultaneously side-by-side with sporting element 62 in pultrusion device 60. It is to be appreciated that in other embodiments a single sporting element 62, or more than two such sporting elements 62, could be formed in pultrusion device 60.

Figure 7:
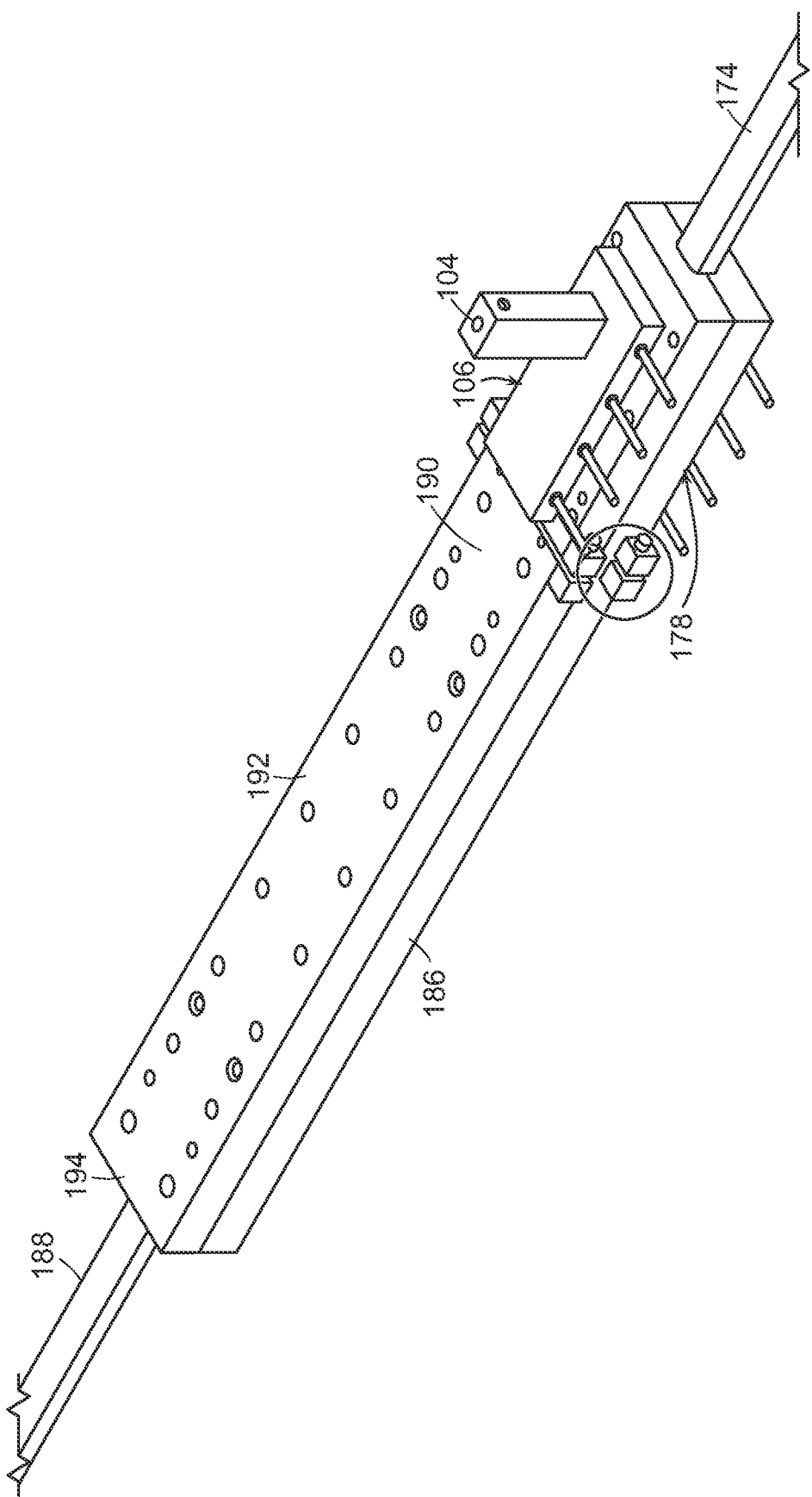
FIG. 7 is a perspective view of a portion of an alternative embodiment of the pultrusion device of FIG. 6.

An alternative embodiment is illustrated in FIG. 7 where like reference numerals are used in the drawings to represent similar or identical components and features as discussed herein. In this example, the resin impregnator 178 is positioned immediately upstream of die 186, with precursor 174 seen here moving right to left into resin impregnator 178. Injection ports 104 may be provided at the top and bottom (not visible) of resin impregnator 178 for the introduction of resin into precursor 174. A heating element 106 may also be provided adjacent resin impregnator 178 to provide heat for the resin and precursor 174 before it reaches the heated die 186. Precursor 174 is cured as it travels through first portion 190, second portion 192, and third portion 194 of heated die 186 so as to form linear member 188.

Figure 8:
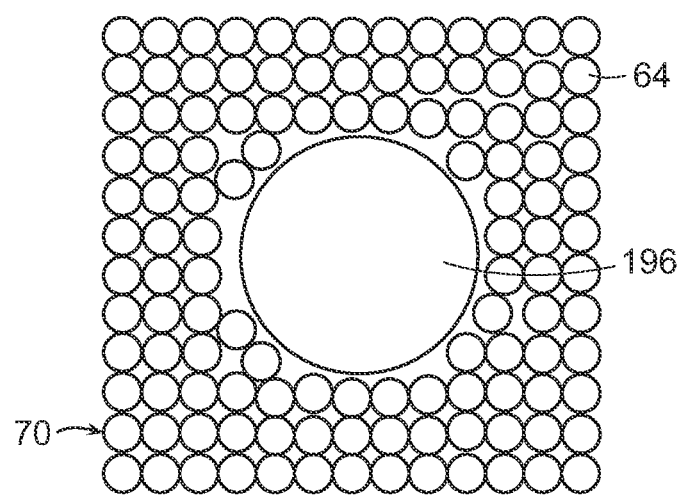
FIG. 8 is a section view of a portion of the pultrusion device of FIG. 6 showing a mandrel in the mat of fibers.

In certain embodiments, as illustrated in FIG. 8, the mat 70 of fibers 64 may be pulled around a mandrel 196 in pultrusion device 60. Mandrel 196 may be secured at a first end thereof to guide 76 and may extend through pultrusion device 60 to a position upstream of a downstream end of heated die 86, and may be positioned in a middle of resin impregnator 78. In the illustrated embodiment, mandrel 196 has a circular cross-section. It is to be appreciated that mandrel 196 may have other cross-sectional shapes such as elliptical, or rectangular, for example. Other suitable cross-sectional shapes for mandrel 196 will become readily apparent to those skilled in the art, given the benefit of this disclosure.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A method of forming a sporting implement comprising:
   pulling a plurality of bundles of fiberglass or carbon fibers from a plurality of spools and a first mat of fibers from a first spool positioned above the bundles and a second mat of fibers from a second spool positioned below the bundles to form a precursor;
   pulling the precursor through a guide of a pultrusion device, the guide having a predetermined profile which forms the precursor with a closed and hollow cross-section;
   pulling the precursor through a resin impregnator in which resin is injected into the precursor at a first temperature;
   pulling the precursor through a preformer;
   pulling the precursor through a heated die at a second temperature higher than the first temperature, the heated die curing the precursor so as to form a continuous linear member; and
   cutting the continuous linear member into a sporting element having a predetermined length.

2. The method of claim 1, wherein at least one reciprocating pulling device pulls the precursor.

3. The method of claim 1, wherein the mat is formed of glass fibers.

4. The method of claim 1, wherein the mat is formed of one of a tri-axial fabric having fibers oriented at 0°, +45°, and −45° with respect to a longitudinal axis of the mat, and a biaxial fabric having fibers oriented at +45° and −45° with respect to a longitudinal axis of the mat.

5. The method of claim 1, wherein the resin is a liquid thermoplastic resin.

6. The method of claim 1, wherein a saw is used to cut the continuous linear member.

7. The method of claim 1, wherein the first temperature at which the resin is injected at approximately 70° C.

8. The method of claim 1, wherein a first portion of the heated die is approximately 85° C., a second portion of the heated die positioned downstream of the first portion is approximately 95° C., and a third portion of the heated die positioned downstream of the second portion is approximately 105° C.

9. The method of claim 1, wherein the guide provides the precursor with a rectangular cross-section.

10. The method of claim 1, wherein the preformer provides the precursor and surfacing material with a rectangular cross-section.

11. The method of claim 1, wherein the mat is pulled from a spool.

12. The method of claim 1, further comprising
    pulling a second plurality of fiberglass fibers and a second mat through the guide to form a second precursor around an internal mandrel;
    pulling the second precursor through the resin impregnator in which resin is injected into the second precursor, wherein the mandrel is located in a middle of a cavity in the resin impregnator;
    pulling a second surfacing material and the second precursor through the preformer downstream of the resin impregnator;
    pulling the second precursor through the heated die, the heated die curing the second precursor so as to form a second continuous linear member, wherein the mandrel extends to a position upstream of an end of the heated die; and cutting the second continuous linear member into a second sporting element having a predetermined length.

13. The method of claim 1 wherein the resin impregnator comprises injection ports positioned at a top and a bottom of the resin impregnator.

14. The method of claim 1 wherein the first temperature is room temperature.

15. A method of forming a sporting implement comprising:

pulling a plurality of bundles of fiberglass or carbon fibers from a plurality of spools and a first mat of fibers from a first spool positioned above the bundles and a second mat of fibers from a second spool positioned below the bundles to form a precursor;

pulling the precursor through a guide of a pultrusion device, the guide having a predetermined profile which forms the precursor with a closed and hollow cross-section;

pulling the precursor through a resin impregnator in which resin is injected into the precursor at a first temperature;

pulling the precursor through a heated die wherein a first portion of the heated die is heated to a second temperature higher than the first temperature, a second portion of the heated die positioned downstream of the first portion is heated to a third temperature higher than the second temperature, and a third portion of the heated die positioned downstream of the second portion is heated to a fourth temperature higher than the third temperature, the heated die curing the precursor so as to form a continuous linear member; and cutting the continuous linear member into a sporting element having a predetermined length.

16. The method of claim 15 wherein the resin impregnator is positioned upstream of the heated die.

17. The method of claim 15 wherein the resin impregnator comprises injection ports positioned at a top and a bottom of the resin impregnator.

18. The method of claim 15 wherein the first temperature is room temperature.

* * * * *